(12) United States Patent
Doverspike et al.

(10) Patent No.: US 6,970,417 B1
(45) Date of Patent: Nov. 29, 2005

(54) METHODS AND SYSTEMS FOR FAST RESTORATION IN A MESH NETWORK OF OPTICAL CROSS CONNECTS

(75) Inventors: Robert Duncan Doverspike, Tinton Falls, NJ (US); Gokhan Sahin, Seattle, WA (US); John Lester Strand, Holmdel, NJ (US); Robert William Tkach, Little Silver, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/474,031

(22) Filed: Dec. 28, 1999

(51) Int. Cl.⁷ .......................... G01R 31/04; H04J 1/16; H04J 3/14
(52) U.S. Cl. ................. 370/216; 370/221; 370/222; 370/225; 370/227
(58) Field of Search ....................... 370/225–228, 370/241, 248, 406, 216, 400, 224, 242, 244, 370/250, 401, 221, 222, 223, 217, 218; 709/239, 709/238; 714/100, 1, 2

(56) References Cited

U.S. PATENT DOCUMENTS

| | | | | |
|---|---|---|---|---|
| 5,495,471 A | * | 2/1996 | Chow et al. | 370/221 |
| 5,742,605 A | * | 4/1998 | Norman, Jr. | 370/405 |
| 5,974,027 A | * | 10/1999 | Chapman | 370/228 |
| 6,163,525 A | * | 12/2000 | Bentall et al. | 370/227 |
| 6,324,162 B1 | * | 11/2001 | Chaudhuri | 370/225 |
| 6,353,593 B1 | * | 3/2002 | Chen et al. | 370/216 |
| 6,359,857 B1 | * | 3/2002 | Ahmad et al. | 370/217 |
| 6,377,543 B1 | * | 4/2002 | Grover et al. | 370/227 |
| 6,392,992 B1 | * | 5/2002 | Phelps | 370/225 |
| 6,421,349 B1 | * | 7/2002 | Grover | 370/408 |
| 6,426,941 B1 | * | 7/2002 | Vaman et al. | 370/228 |
| 6,549,513 B1 | * | 4/2003 | Chao et al. | 370/227 |
| 6,804,199 B1 | * | 10/2004 | Kelly et al. | 370/238 |

* cited by examiner

Primary Examiner—Ajit Patel

(57) ABSTRACT

The present invention provides methods and systems for restoring communication in a fiber optic network by placing error detection circuitry at the add/drop ports of the network nodes of the network. If the error detection circuitry detects an error condition for a communication signal traversing a normal communication path within the network, the communication signal is rerouted along a restoration communication path that is node and span disjoint from the first communication path. By requiring a restoration path to be node and span disjoint from the normal communication path, error detection circuitry need only be placed at the end nodes of the normal communication path. By allowing each node in the restoration path to dynamically choose the particular channels that can accommodate a particular communication signal at the time of the restoration, efficient use of available resources is gained. The result is a cost effective network that restores communication in times competitive to that of SONET rings.

41 Claims, 7 Drawing Sheets

METHODS AND SYSTEMS FOR FAST RESTORATION IN A MESH NETWORK OF OPTICAL CROSS CONNECTS

BACKGROUND OF THE INVENTION

1. Field of Invention

This invention relates to methods and systems for quickly restoring communication after a failure in a mesh network.

2. Description of Related Art

Modern communication networks serve to transport large volumes of information between a number of locations connected with the network. The communication network includes a set of nodes and links interconnecting each of the nodes to other nodes. The traffic across a link between two nodes in a communications network can represent a formidable volume of information flow. As a communication network carries more data, the failure of a single node or link within the network can have a greater impact. For example, the sudden failure of such a link can cause a significant loss in revenue for a network owner and loss of commerce and other benefits for the network subscribers.

Presently, Synchronous Optical Network (SONET) rings provide the primary technology for optical layer communication and restoration from network failures. While SONET rings can quickly restore a failed communication channel, SONET rings are inefficient communication vehicles compared to "mesh" network topologies. However, fast restoration in an optical mesh network can require sophisticated error detection of the digital traffic somewhere in the network that can be very expensive. Accordingly, there exists a need for methods and systems that can quickly restore communication in a mesh network upon detecting a failure, yet use a minimum of error detection circuitry.

SUMMARY OF THE INVENTION

The present invention provides methods and systems for restoring communication in a fiber optic network by placing error detection circuitry at the add/drop ports of the network nodes of an optical mesh network. The error detection circuitry can monitor communication signals as they are received from other network nodes and exit the network to an external location. If an error condition for a particular communication signal traversing a communication path becomes excessive or if the communication path fails completely, the error detection circuitry of the add/drop port of an end node in the communication path can sense the problem and reroute the communication signal along a restoration communication path that, except for the end nodes, is node and span disjoint from the normal communication path.

By strategically requiring a restoration path to be node and span disjoint from the failed normal communication path, error detection circuitry need only be placed at the add/drop ports of the end nodes along the normal communication path where communication signals enter and exit a mesh network. By allowing the nodes in the restoration path to choose the channels in the transmission lines that carry the communication signal at the time of restoration, efficient use of available resources is gained. The result is a cost effective network that restores communication in times competitive to that of SONET rings.

BRIEF DESCRIPTION OF THE DRAWINGS

The invention is described in detail with reference to the following figures, where like numerals reference like elements, and wherein.

DETAILED DESCRIPTION OF PREFERRED EMBODIMENTS

Because of recent advances and subsequent deployment of dense wavelength division multiplexing systems, a new network layer, known as the optical layer has emerged. Currently, Synchronous Optical Network (SONET) rings provide the primary technology for optical layer communication and restoration from network failures. The SONET standards are predefined standards especially designed for optical communication systems and are described in detail by the ANSI T1.105 documentation. While SONET rings can quickly restore a failed communication channel, SONET rings are inefficient communication vehicles compared to "mesh" network topologies.

Figure 1:
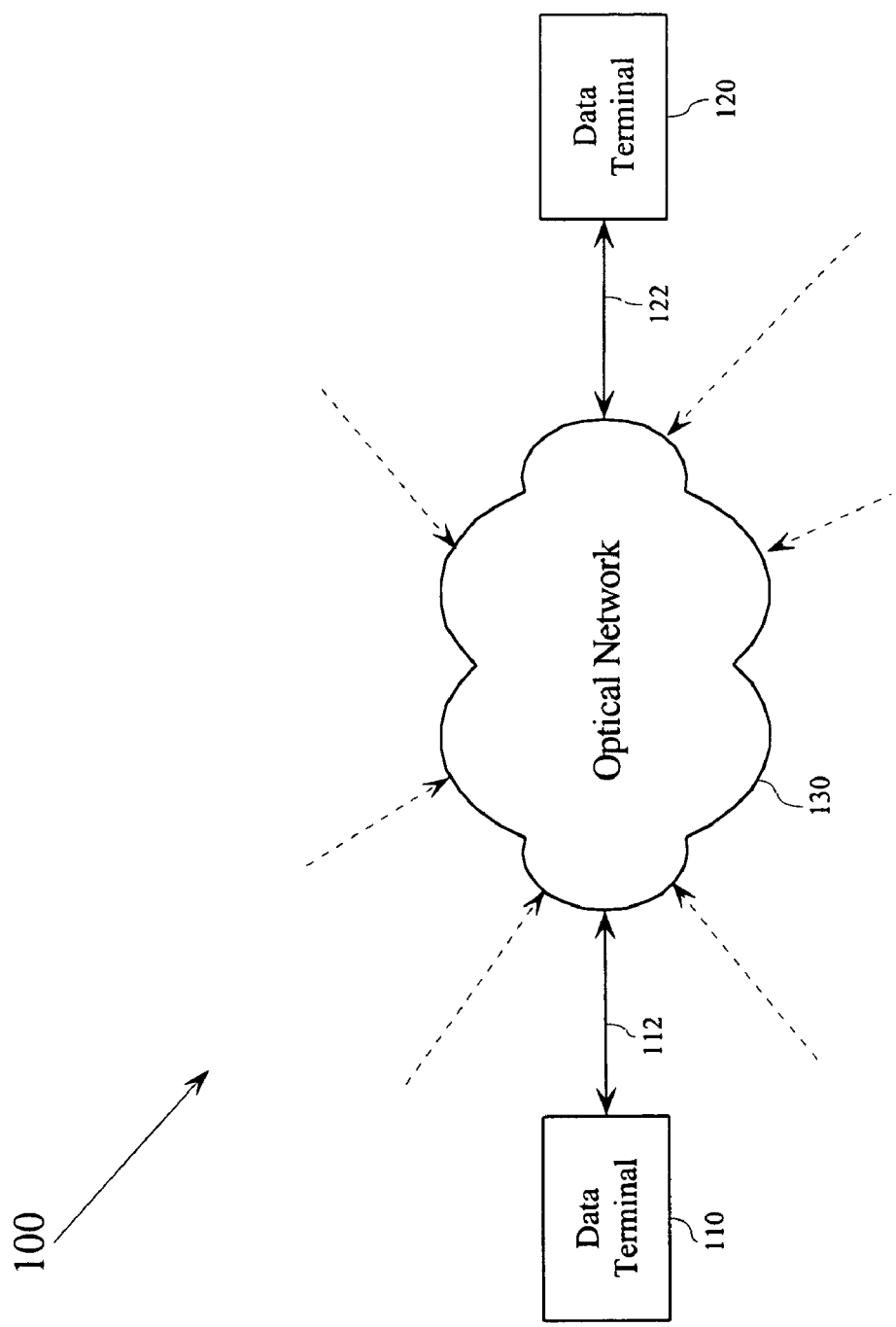
FIG. 1 is a block diagram of an exemplary communications network according to the present invention.

FIG. 1 shows an exemplary block diagram of a communication system 100. The communication system 100 includes a first data terminal 110 connected to an optical mesh network 130 through a first data link 112, and a second data terminal 120 connected to the optical mesh network 130 through a second data link 122. The optical mesh network 130 can accommodate communication between the first data terminal 110 and the second data terminal 120 by providing an internal communication path capable of transmitting and receiving communication signals between links 112 and 122. Furthermore, the optical mesh network 130 can self repair upon sensing a failure of the normal communication path within the network 130 by establishing a restoration communication path.

The data terminals 110 and 120 transmit/receive communication signals to/from the optical mesh network 130 over their respective links 112 and 122. The data terminals 110 and 120 can be any one of a number of different types of data terminals, such as computers, routers, SONET terminals, ATM switches, cellular phones, satellites, storage devices, or any combination of software and hardware capable of generating, relaying, recalling from storage any information capable of being transmitted to the optical mesh network 130. Furthermore, the data terminals 110 and 120 can be any number of different types of data receivers capable of receiving digital information such as digital computers, routers, SONET terminals, ATM switches, cellular phones, satellites, storage mediums, transceivers, or any combination of hardware and software capable of receiving, relaying, storing, sensing or perceiving information transmitted from the optical mesh network 130.

The links 112 and 122 can be any known or later developed device or system for connecting the data terminals 110 and 120 to the optical mesh network 130. Such devices include direct serial/parallel cable connections, satellite links, wireless links, connections over a wide area network or a local area network, connections over an intranet, connections over the Internet or connections over any other distributed processing network or system. Additionally, the links 112 and 122 can be software devices linking various software systems. In general, the links 112 and 122 can be any known or later developed connected systems, computer programs or structures usable to connect the data terminals 110 and 120 to the optical mesh network 130.

In operation, communication paths within the optical mesh network 130 can occasionally fail. Upon such failures, the optical mesh network 130 can quickly self-repair by establishing new internal communication paths between links 112 and 122. The restoration process starts as the optical mesh network 130 detects a problem using fault detection devices at one of the end nodes (not shown) connecting the optical mesh network 130 to one of the data links 112 or 122. Upon detection of a problem, the optical mesh network 130 reroutes communication from the failed internal communication path to a new communication path within the network 130, thereby restoring communication.

Figure 2:
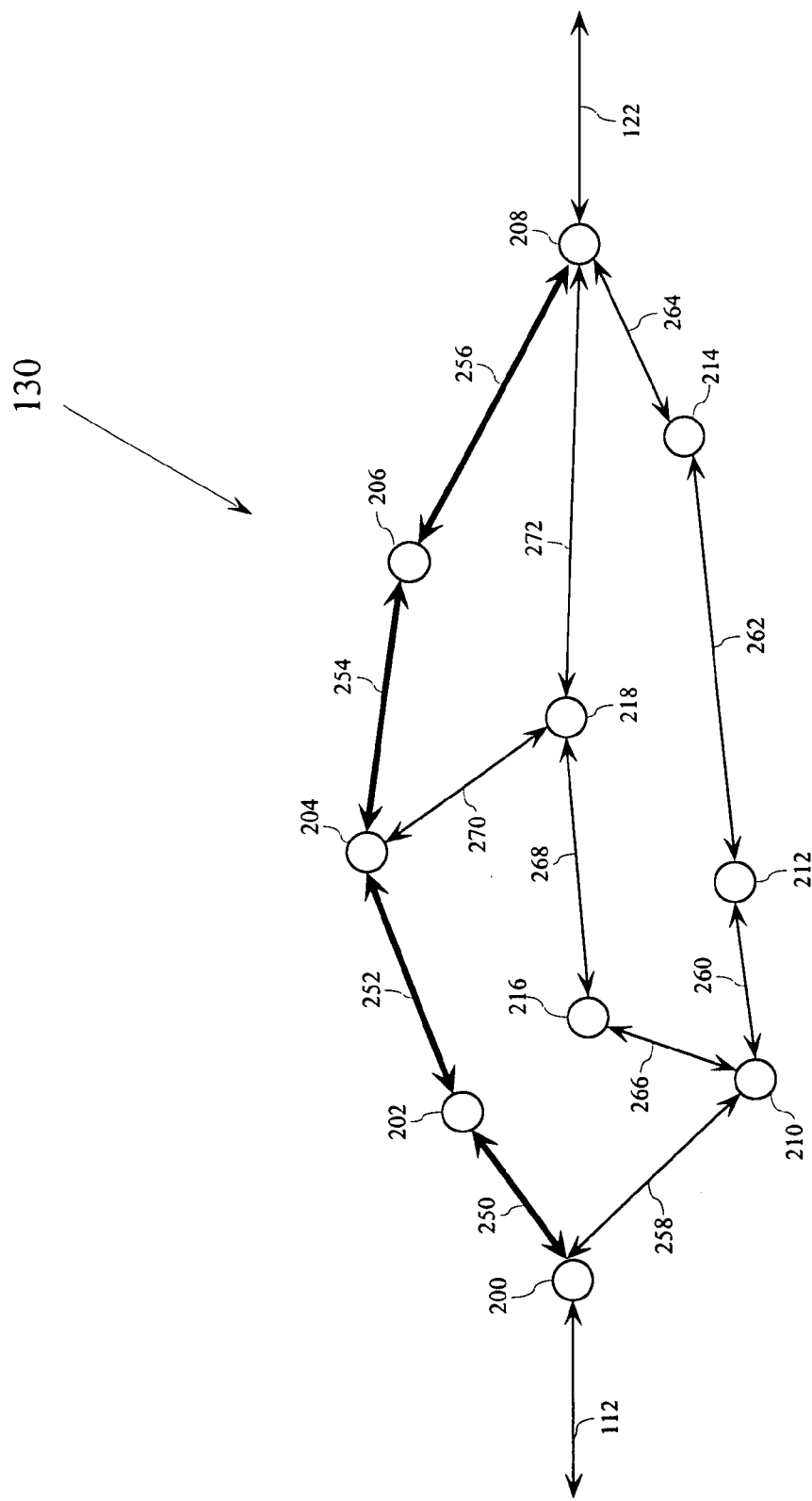
FIG. 2 is a diagram of an exemplary mesh network carrying communication traffic according to the present invention.

FIG. 2 is a block diagram of an exemplary optical mesh network 130 having a set of communication nodes having even-numbered reference numerals within the range 200–218 (hereinafter collectively referred to as nodes 200–218) interconnected through a series of transmission lines having even-numbered reference numerals within the range 250–272 (hereinafter collectively referred to as transmission lines 250–272). While FIG. 2 depicts an optical mesh network with ten nodes 200–218, it should be appreciated that the size of a mesh network is not important and mesh networks of any size can be used without departing from the spirit and scope of the present invention.

The communication nodes 200–218 of the exemplary mesh network 130 are optical cross connect (OXC) nodes capable of passing communication traffic to/from other communication nodes 200–218 via transmission lines 250–272 and to locations external to the mesh network 130. As shown in FIG. 2, nodes 200 and 208 are connected to links 112 and 122, respectively, making nodes 200 and 208 end nodes for the purpose of this example. These end nodes 200 and 208 can transform outgoing optical communication signals to electrical signals suitable for transmission over links 112 and 122, and likewise can transform incoming electrical signals to optical signals suitable for transmission throughout the mesh network 130.

In normal operation, mesh network 130 passes communication signals across the mesh network 130 via a normal communication path. The communication signal can be either unidirectional (one way) or bi-directional (two way). A normal communication path is formed by at least two nodes interconnected by at least one transmission line 250–272. In this example, links 112 and 122 are connected by a normal communication path (shown in bold) passing along communication nodes 200-202-204-206-208. End node 200 receives communication signals from a data terminal over link 112 and routes the communication signals directly to node 202 and indirectly to nodes 204, 206 and 208 where it is then passed to link 122. Likewise, end node 208 receives communication signals from a second data terminal over link 122 and routes the communication signals directly to node 206 and indirectly to nodes 204, 202 and 200 where it is then passed to link 112.

In addition to providing communication paths for the external devices, the various communication nodes 200–218 can also transmit and relay status information and commands to each other. For example, node 200 can transmit information to node 208 indirectly through nodes 202, 204 and 206 that node 200 detected a failure in a received communication signal. In response, node 208 can transmit commands to any of the other nodes 202–218 to reroute the user traffic along another path.

The end nodes 200 and 208 of the exemplary network 130 include error detection circuitry that can detect errors in communication signals as they are routed from the mesh network 130 to an external data link 112 and 122. The types of error conditions that can be measured by end nodes 200 and 208 include single bit errors, octet errors, cyclic redundancy check (CRC) errors, checksum errors, framing errors and loss of signal errors. However, as communication standards evolve and new standards develop, it should be appreciated that any error condition or failure capable of being measured can be used without departing from the spirit and scope of the present invention.

As every physical communication system can occasionally produce occasional errors, a determination can be made as to what kind of errors of any given class of errors is acceptable. For example, three or four single bit errors per hour can be an acceptable error condition for some applications yet not acceptable for other applications. Additionally, an isolated burst of framing errors or a very short loss of signal can be acceptable in certain circumstances. As different error conditions and failures can occur for various environments with different requirements, it should be appreciated that any measure of acceptable and unacceptable error conditions can be used without departing from the spirit and scope of the present invention.

As discussed above, in the event one of the communication nodes 202–208 or transmission lines 250–256 along the normal communication path fails or is determined to have an unacceptable error condition, the optical mesh network 130 can self-repair by establishing a restoration communication path. In the exemplary mesh network 130, the restoration path is established by one of the end nodes 200 or 208 transmitting commands to other nodes 200–218 instructing them to reconfigure themselves to form the restoration path.

For the purpose of this example, nodes 200-202-204-206-208 form the "normal" communication path between links 112 and 122. A "normal" communication path can be defined as any communication path chosen to accommodate communication between links 112 and 122. Likewise, a "restoration" path for links 112 and 122 is any other path that can accommodate communication between links 112 and 122 that is node and span disjoint from the normal communication path. Two paths are "node and span disjoint" if they have no intermediate nodes or transmission lines in common. For example, nodes 200-210-216-218-208 and nodes 200-210-212-214-208 can form two restoration paths that are node and span disjoint from the normal communication path 200-202-204-206-208 as the two potential restoration paths have no elements, except for end nodes 200 and 208, in common with the normal communication path.

While the exemplary mesh network 130 depicts the transmission lines 250–272 as single communication paths, it should be appreciated that each transmission line 250–272 can be a single optical fiber independently transmitting a large number of optical communication signals in the same direction or in opposite directions using a wavelength division multiplexing (WDM) scheme, or the transmission lines 250–272 can be any number of independent optical fibers capable of transmitting large numbers of independent optical communication signals. For the purpose of this example, each wavelength in a WDM transmission line or optical signal in separate transmission lines capable of transmitting a communication signal is referred to as a channel. For example, a single WDM transmission line carrying eighty separate wavelengths each capable of carrying a separate communication signal is said to have eighty channels.

Because communication signals traversing the same communication path can be independent, communication failures can occur in a single direction without affecting communication signals in the opposite direction. For example, communication node 200 can transmit information to node 208 flawlessly while the information transmitted from node 208 to 200 can fail completely.

Figure 3:
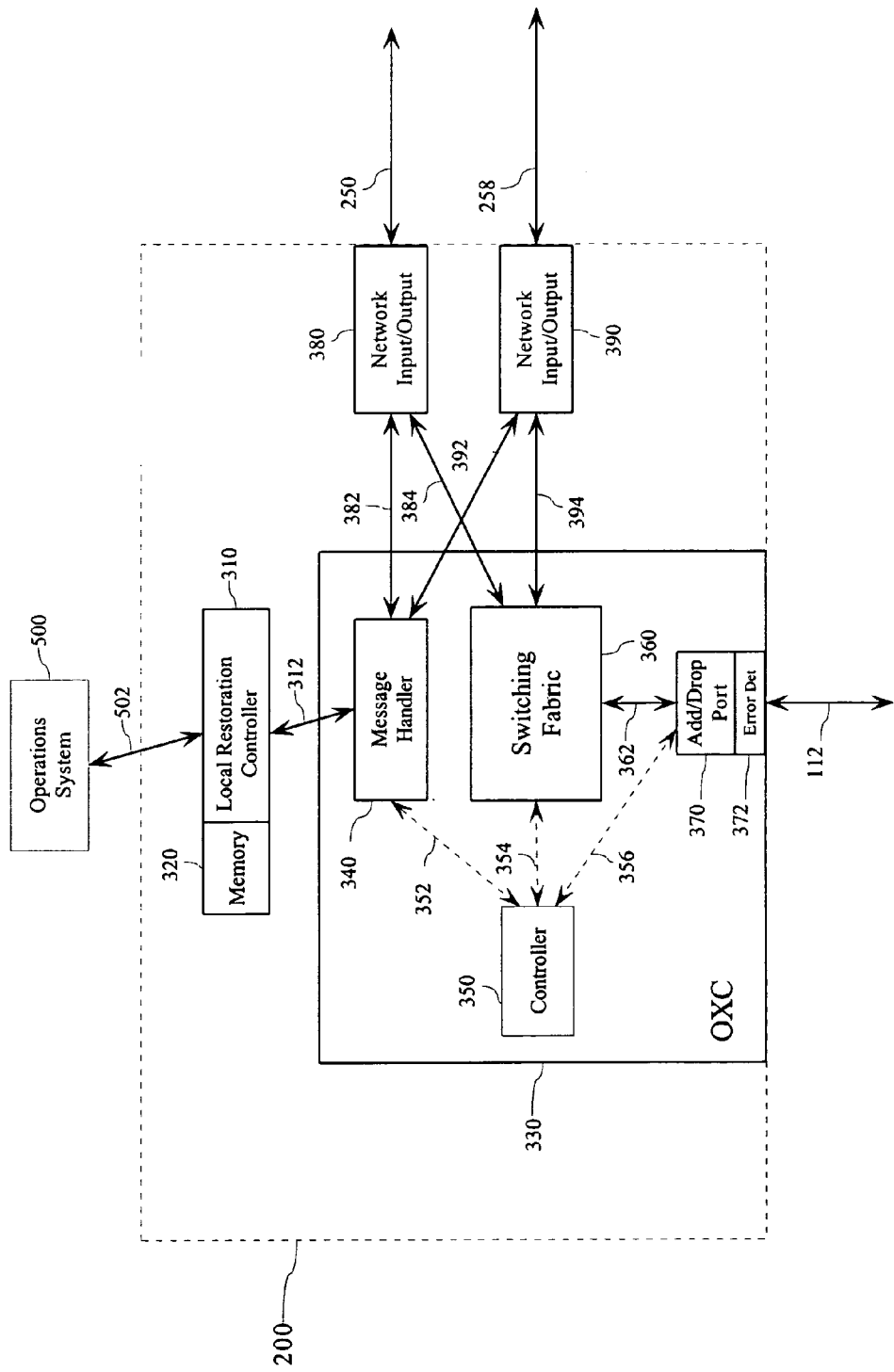
FIG. 3 is a block diagram of an optical node of the exemplary mesh network of FIG. 2.

FIG. 3 is a block diagram of an exemplary communication node 200 according to the present invention. The communication node 200 has a local restoration controller (LRC) 310 including a local restoration controller memory 320, an optical cross-connect (OXC) switch 330, a first network input/output circuit 380 and a second network input/output circuit 390. The optical cross-connect 330 further includes a message handler 340, a OXC controller 350, a switching fabric 360 and an add/drop port 370 with error detection circuitry 372.

The OXC controller 350 is connected to the message handler 340 via link 352, as well as to the switching fabric 360 via link 354 and to the add/drop port 370 via link 356. The message handler 340 is connected to the local restoration controller 310 via link 312 and the local restoration controller 310 is further connected to an external operations system 500 via link 502. The message handler 340 is also connected to the first network input/output circuit 380 and the second network input/output circuit 390 via links 382 and 392, respectively. The first and second network input/output circuits 380 and 390 are further connected to the switching fabric 360 via links 384 and 394, respectively. Finally, the switching fabric 360 is connected to the add/drop port 370 via link 362.

In operation, and under control of the OXC controller 350, the add/drop port 370 receives and transmits data signals to/from a data terminal over link 112. The add/drop port 370 converts electrical signals from link 112 to an optical format and routes these optical signals to the switching fabric 360. Conversely, the add/drop port 370 can receive optical signals from the switching fabric 360 via link 362, convert them to an electrical format, and then route the electrical signals to link 112.

In addition to handling communication signals between the switching fabric 360 and link 112, the add/drop port 370 contains an error detection circuit 372 that can detect errors and network failures based on the signals received from the switching fabric 360. Upon detecting an error, the add/drop port 370 can inform the OXC controller 350 via link 356 about information concerning an error condition or a network failure.

The switching fabric 360, under control of the OXC controller 350, can route the optical data signals received from the add/drop port 370 to either or both of the network input/output circuits 380 and 390. Conversely, the switching fabric 360 can route optical data signals received from either or both of the network input/output circuits 380 and 390 to the add/drop port 370. Furthermore, the switching fabric 360 can receive optical data signals from one of the network input/output circuits 380 and route the optical data signals to the other of the network input/output circuits 380 or 390. While the exemplary switching fabric 360 is essentially an optical device, it should be appreciated that the switching fabric 360 can be a purely electrical switching device accommodated by electrical-to-optical and optical-to-electrical transducers or the switching device 360 can any combination of optical and electrical technologies without departing from the spirit and scope of the present invention.

The network input/output circuits 380 and 390 can receive a number of different WDM optical data signals from transmission lines 250 and 258 respectively, convert the WDM optical signals to optical signals to non-WDM signals residing on separate optical conduits, and route these non-WDM optical data signals to the switching fabric 360 via links 384 and 394, respectively. The network input/output circuits 380 and 390 can also receive optical data signals residing on separate optical conduits from the switching fabric 360, multiplex the optical data signals according to a WDM scheme and transmit the WDM optical data signals to a network over transmission lines 250 and 258. Furthermore, the network input/output circuits 380 and 390 can route WDM optical data signals received from the transmission lines 250 and 258 to the message handler 340 via links 382 and 392, respectively.

The message handler 340, can receive data signals from the network input/output circuits 380 and 390, extract information and commands from these signals and pass the information and commands either to the local restoration controller 310 or to the OXC controller 350 via link 312 or 352 respectively. Furthermore, the message handler 340 can receive commands from either the local restoration controller 310 or the OXC controller 350 and transmit information and commands to one or both of the network input/output circuits 380 and 390 that can be received by other communication nodes within the mesh network 130.

The message handler 340 of the exemplary embodiment can also receive information about the configuration of the mesh network 130 from the local restoration controller 310, including information on various different communication paths that the communication node 200 can use to restore communication in the event of a network failure. The message handler 340 can either pass information from the local restoration controller 310 to the OXC controller 350 or the message handler 340 can pass the information to either of the network input/output circuits 380 and 390.

The local restoration controller 310 stores information about the mesh network 130 in which the communication node 200 resides, including alternate communication paths that can be used to restore data communication between the communication node 200 and another communication node in the event of a failure of a normal communication path. The alternate communication paths stored by the exemplary local restoration controller 310 are restoration paths that are node and span disjoint from the normal communication paths.

The local restoration controller 310 can receive the network information from the operations system 500 via link 502, and store it in the local restoration controller memory 320. Alternatively, the local restoration controller 310 can receive the network information from the message handler 340 via link 312 which in turn can receive it directly or indirectly from the network input/output interfaces 380 and 390 or from the drop/add port 370.

The local restoration controller 310 can also receive information from the message handler 340 such as information concerning the operating status of the communication node 200 as well as any performance information determined or received by the communication node 200. The information stored can immediately or later be transferred to the operations system 500, as required.

While the exemplary local restoration controller memory 320 resides on a nonvolatile permanent storage medium such as a hard disk, the memory 320 can reside on any computer readable storage medium including a CD ROM, floppy disk, read only memory, static RAM, dynamic RAM and flash memory or the like without departing from the spirit and scope of the present invention.

During operation, in the event of a network failure or some other problem that causes an unacceptable number of errors in a communication signal transmitted across the network, the add/drop port 370, using its error detection circuit 372 can detect the problem and inform the local restoration controller 310 using the OXC controller 350 and message handler 340. The local restoration controller 310 can then issue commands to the OXC controller 350 to reconfigure the OXC 330 along a predetermined restoration path. Furthermore, the local restoration controller 310 can issue commands to the message handler 340 to package and send messages to other network input/output circuit 380 or 390 to be relayed to communication nodes within the mesh network 130 to establish the restoration path. The instructions sent by the local restoration controller 310 through the message handler 340 can direct the other communication nodes to reroute only one of the received or transmit portions of each communication signal residing in the original data path or the OXC controller 350 can issue commands to reroute both the transmission and reception portions of each communication signal.

As an alternative to directly reconfiguring a network, the local restoration controller 310 can, instead of issuing commands to other communication nodes, merely instruct the message handler to inform one or more other communication nodes about the error condition or failure. One of the other communication nodes can then later issue commands to communication node 200 to reconfigure itself to restore communication according to the received directions.

Figure 4:
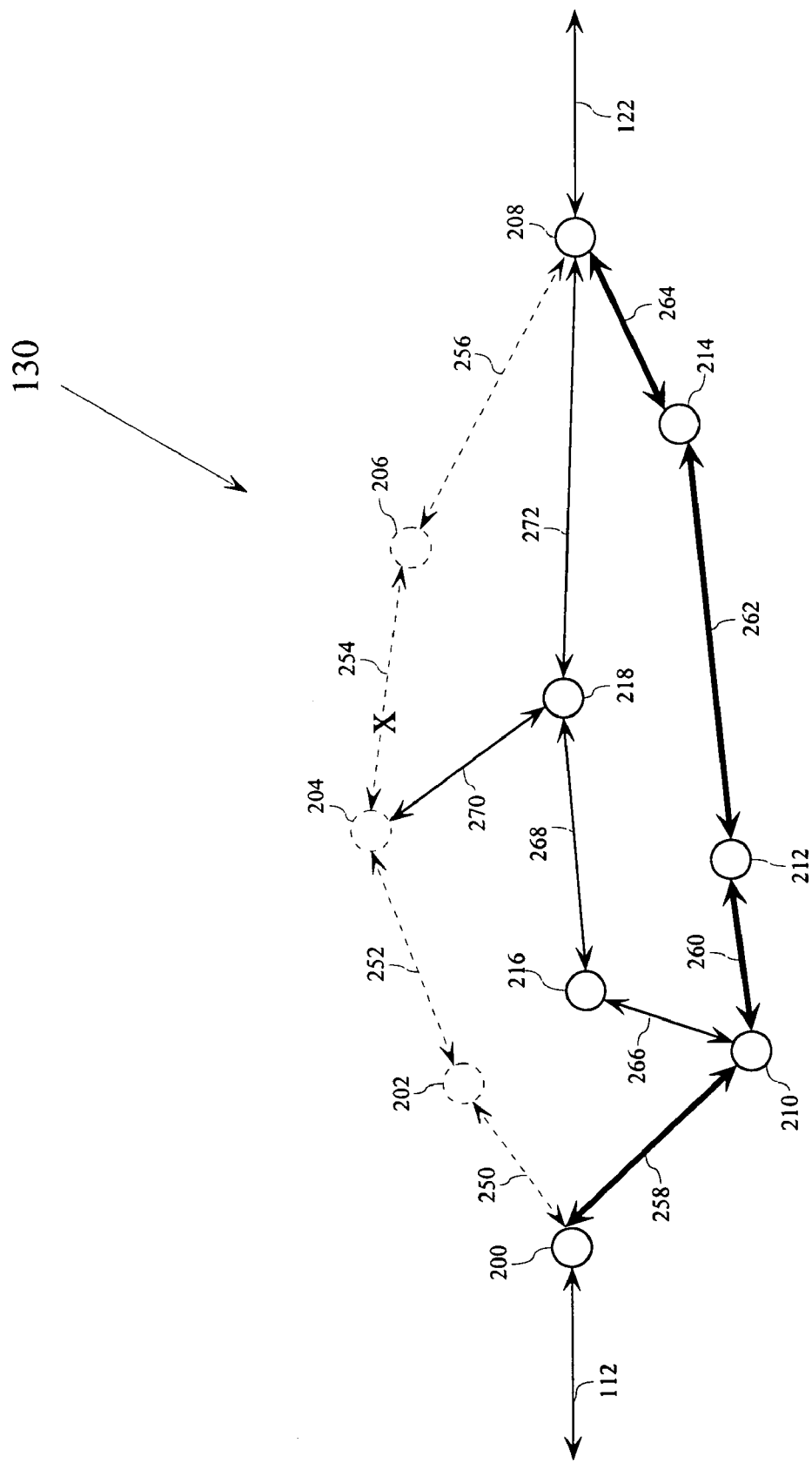
FIG. 4 is a diagram of the exemplary mesh network of FIG. 2 with communication traffic rerouted along a restoration path.

FIG. 4 shows an example of the mesh network 130 of FIG. 2 where a failure occurred on transmission line 254 between communication nodes 204 and 206 of the normal communication path. If the failure is unidirectional, only the end node 200 or 208 receiving the failed signal can sense the failure. If the failure is bi-directional, the failure can be sensed by both end nodes 200 or 208, and subsequently, either communication node 200 or 208 can issue commands to reroute the communication signal along a new path 200-210-212-214-208.

As shown in FIG. 4, the new communication path, or restoration path, between nodes 200 and 208 is node and span disjoint from the original data path. That is, not including the end nodes 200 and 208, the transmission lines 250–256 and communication nodes 202–206 of the normal path have no elements in common with the transmission lines 258–264 and nodes 210–214 of the restoration path. Because the error detection capability for any normal communication path is located at that path is the end nodes, end nodes 200 and 208 cannot determine the exact location along the normal path causing the error condition or failure. However, by requiring that a restoration path be node and span disjoint from the normal path, the exact location of the problem in the normal path is not required to restore communication. An inspection of FIGS. 2 and 4 shows that if any intermediate node 202–206 or any transmission line 250–256 along the normal path fails, the restoration path will not share the failed component.

In the exemplary embodiment, the end nodes 200 and 208 can restore data communication by issuing commands to the intermediate nodes 210, 212 and 214 along the restoration path to reconfigure themselves to pass communication signal between the two end nodes 200 and 208. The end nodes 200 and 208 can each issue unilateral (one way) reconfiguration commands to the intermediate nodes 210–214 to re-establish one way communication along the restoration path, or either end node 200 or 208 can issue bi-directional reconfiguration commands to the intermediate nodes 210–214 to establish bi-directional communication along the restoration path.

As discussed above, each transmission line 250–272 of the exemplary network 130 can be a fiber optic cable having a large number of WDM channels. While the restoration path can be determined before the failure, the channels of the transmission lines 258–264 along the restoration path carrying a communication signal can be determined after the failure is detected. By assigning spare WDM channels during restoration, channel resources can be efficiently allocated without causing significant delays.

Figure 5:
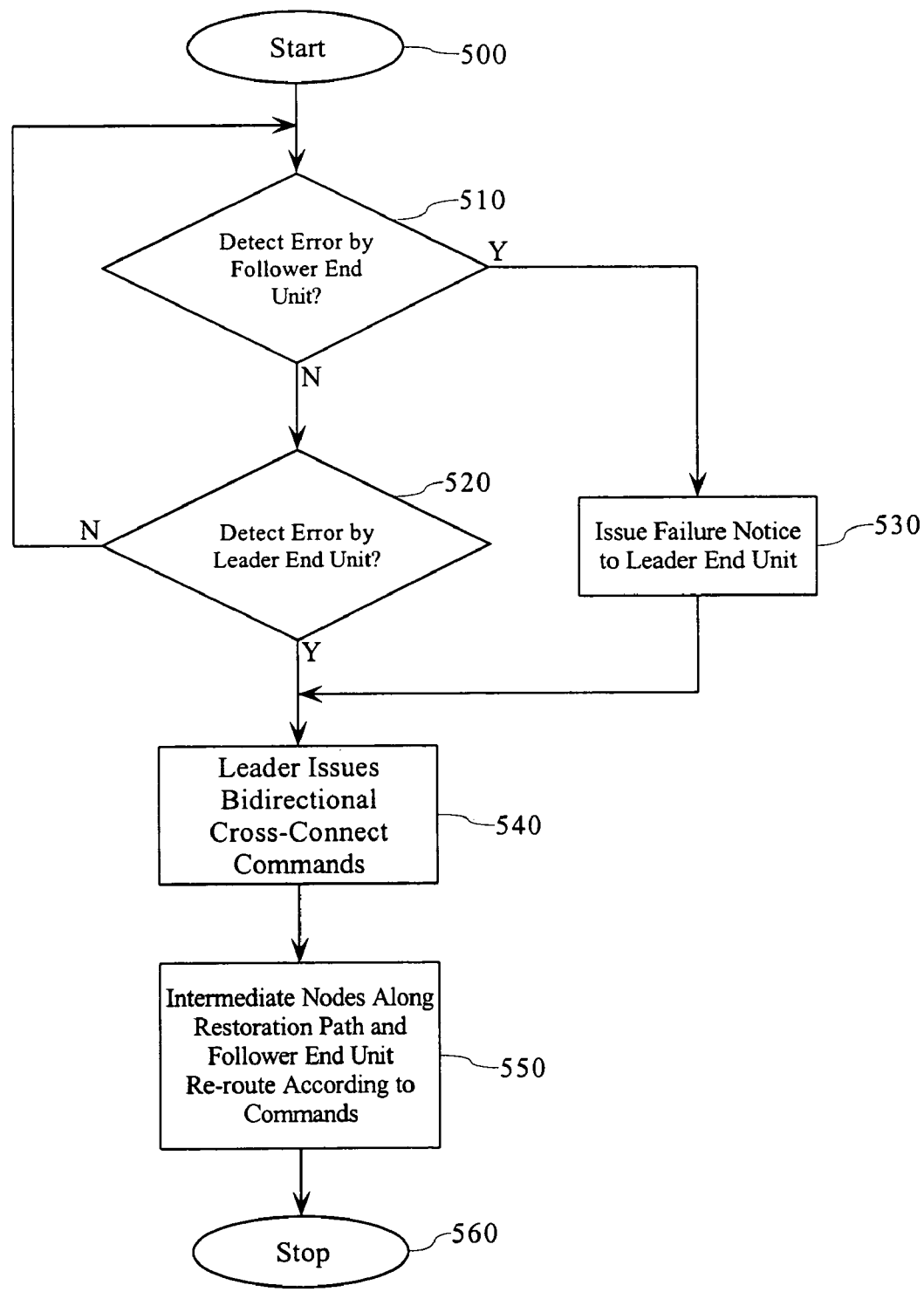
FIG. 5 is a flowchart illustrating an exemplary method for rerouting a communication signal according to the present invention.

FIG. 5 is a flowchart outlining an exemplary embodiment of a first method for restoring communication in a mesh network according to the present invention. In this embodiment, one of the two end nodes along a communication path within a mesh network is designated the leader node and the other is designated the follower node. Regardless of whether the leader node, follower node or both nodes sense a failure, only the leader node issues commands to other nodes within the network along a restoration path to restore communication.

The process starts in step 500 and continues to step 510 where the follower node determines whether an excessive error condition or failure in a data communication path passing traffic between the end nodes has occurred. If an error threshold is exceeded or a failure detected, then the process continues to step 530, otherwise, the process continues to step 520.

In step 530, because the follower node detected an error threshold or failure condition, the follower node issues a failure notice to the leader node. The failure notice of the exemplary embodiment can be a SONET far end receive failure (FERF) or an Alarm Indication Signal (AIS) signal sent to the leader node using a dedicated communication channel in a wavelength division multiplexed fiber optic system. However, the failure indication can be of any form such as dedicated signaling bits interleaved with the information traffic, signals sent along any dedicated communication channel or any other form without departing from the spirit and scope of the present invention. The process continues to step 540.

In contrast, in step 520, because the follower node did not detect an excessive error condition or failure, a determination is made by the leader node whether the leader node senses an excessive error condition or failure. If the leader node senses an excessive error condition or failure, the process continues to step 540, otherwise, the process returns to step 510 where the follower node again makes its error/failure determination.

It is to be understood that, while FIG. 5 depicts the error determination steps 510 and 520 as occurring in serial fashion, it should be appreciated that because the leader and follower nodes can sense errors independently, steps 510 and 520 can occur in parallel and do not necessarily flow serially.

In step 540, because either the leader node detected an excessive error condition or failure or the follower node issued a notice to the leader node, the leader node issues bi-directional cross-connect commands to the other nodes in the restoration path, including the follower node. In the exemplary method, the leader node can issue commands to each of the other nodes by using the intermediate nodes along the restoration path to relay the restoration commands to each node not directly connected to the leader node. For example, the leader node can issue a restoration command directly to a first intermediate node, then issue a second restoration command indirectly to a second intermediate node by sending the second command to the first intermediate node, which can then forward the second command to the second intermediate node. By "fast-forwarding" commands in this fashion, rather than issuing command and waiting for each node to reconfigure before issuing another command, restoration is expedited. However, it should be appreciated that an end node such as the leader node can issue commands serially, simultaneously or in any order or fashion without departing from the spirit and scope of the present invention.

As discussed above, the restoration path of the exemplary method is node and span disjoint from the original path, however, because a network may not have a viable restoration path that is completely node and span disjoint, it should be appreciated that the restoration path, upon necessity, may contain common elements with the normal communication path without departing from the spirit and scope of the present invention. However, if the restoration path is not disjoint from the normal communication path, restoration of the communication signal is not assured. The process continues to step 550.

In step 550, the intermediate nodes along the restoration path as well as the follower node reconfigure themselves to reroute the communication signals according to the commands issued from the leader node. In the exemplary method, reconfiguration of each intermediate nodes can occur contemporaneously with the restoration commands of step 540. For example, in the scenario described above, the first intermediate node can begin restoration immediately after receiving its command. While the first intermediate node is reconfiguring, the second restoration command can be received by the first intermediate node and relayed to the second intermediate node. However, it should be appreciated that reconfiguration of each node can occur any time after receiving a restoration command without departing from the spirit and scope of the present invention.

Also, as discussed above, each transmission line of a network can be a fiber optic cable having a large number of WDM channels. While the restoration path can be determined before the failure, the particular channels along the restoration path used can be determined after the failure is detected. By assigning spare WDM channels during restoration, channel resources can be efficiently allocated without causing significant time delays.

In the exemplary method, channels can be assigned by each node along the restoration as they reconfigure themselves. However, other channel assignment techniques such as using a single node to collect channel information and coordinate channel assignment can be used without departing from the spirit and scope of the invention. The process then continues to step 560 where the process stops.

Figure 6:
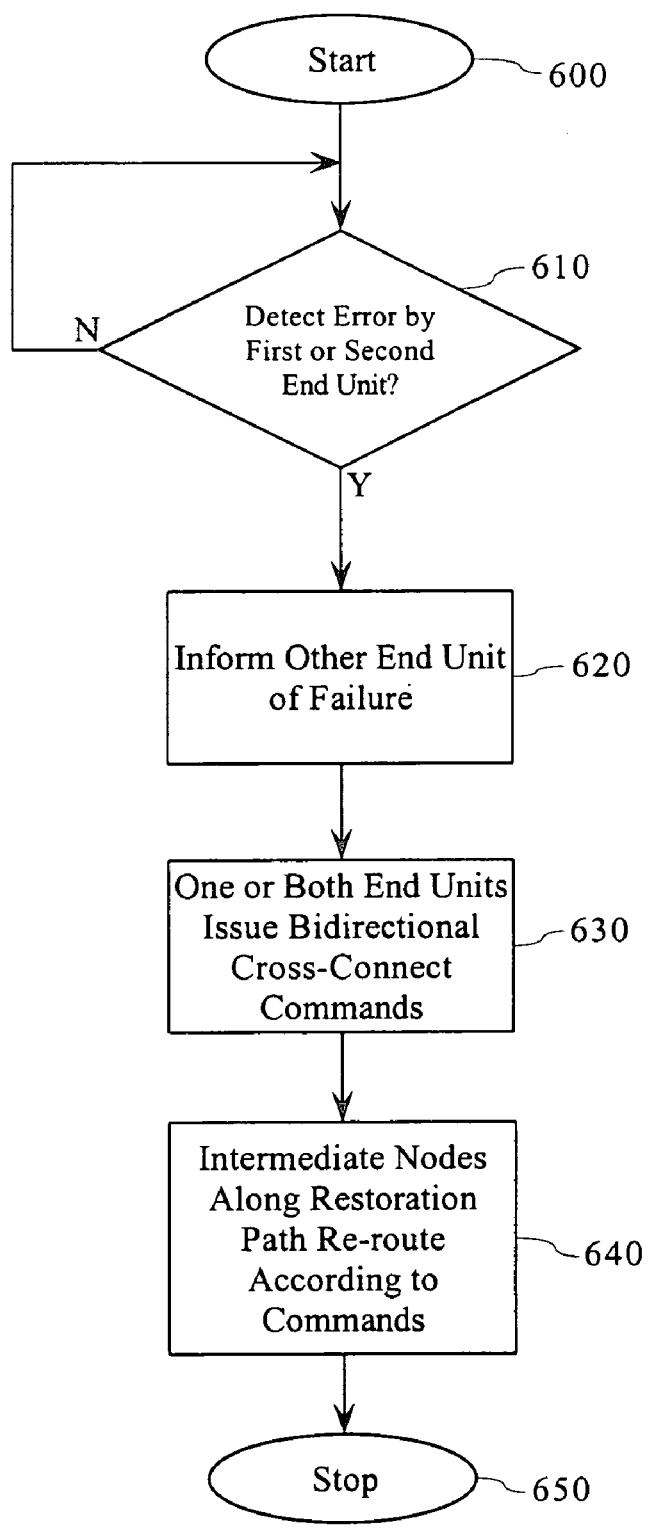
FIG. 6 is a flowchart illustrating a second exemplary method for rerouting a communication signal according to the present invention.

FIG. 6 is a flowchart outlining a second exemplary method for restoring communication in a network according to the present invention, however, unlike the exemplary method of FIG. 5, the end nodes of the method of FIG. 6 can both independently issue reconfiguration commands. The operation starts in step 600 and continues to step 610 where a determination is made by either a first end node or a second end node whether an excessive error condition or failure is detected. If an excessive error condition or failure is detected by either end node, the process continues to step 620, otherwise, step 610 is repeated.

In step 620, because an excessive error condition or failure is detected, the end node detecting the problem informs the other end node along the data communication path that a failure has occurred. Because a failed communication path can preclude either end node from issuing a failure notice to the other end node, it should be appreciated that, while step 620 can expedite restoration of the network, failure to alert the other end node does not preclude restoration as only one end unit is required to restore communication. The process continues to step 630.

In step 630, either or both the first and second end units issue bi-directional cross-connect commands to the intermediate nodes along the restoration path as well as to each other. As discussed above, because the network failure may preclude the first end node from contacting the second end node, only one of the end units actually needs to issue commands, however, when both end units issue commands, restoration of the network is expedited. The process continues to step 640.

In step 640, the intermediate nodes along the restoration path reconfigure themselves to reroute the communication path according to the commands issued by the end units. Because the two communication end nodes are working independently, the restoration processes can meet somewhere in the middle of the restoration path. However, it should be appreciated that one of the end communication nodes can possibly reroute the communication path before the other communication end node begins to issue its own commands.

It should be appreciated that, if both end nodes issue restoration commands, channel contention problems can arise as restoration commands for a restoration path converge from different directions and/or for different communication signals. To avoid contention, the nodes can be coordinated so that they don't assign different communication signals to the same channel and/or don't assign a single communication signal to two or more different channels. However, it should be appreciated that any method to avoid channel contention can be used without departing from the spirit and scope of the present invention.

If channel contention does occur or if there are no spare channels in a given transmission line along the restoration path are available to complete a communication signal, one or both of the nodes can issue back-off commands to the other nodes to release control over any channel already reserved for the communication signal. By using a back-off scheme, contention problems can be cured and channel resources can be made available for other restoration paths.

Furthermore, as with the previous method, because each transmission line of a network can have a large number of independent channels, the particular channels along the restoration path that will carry a particular communication signal can be determined after the failure is detected.

After all of the communication nodes in the restoration path have reconfigured themselves to rerouted communication traffic along the new communication path, the process continues to step 650 where the process stops.

Figure 7:
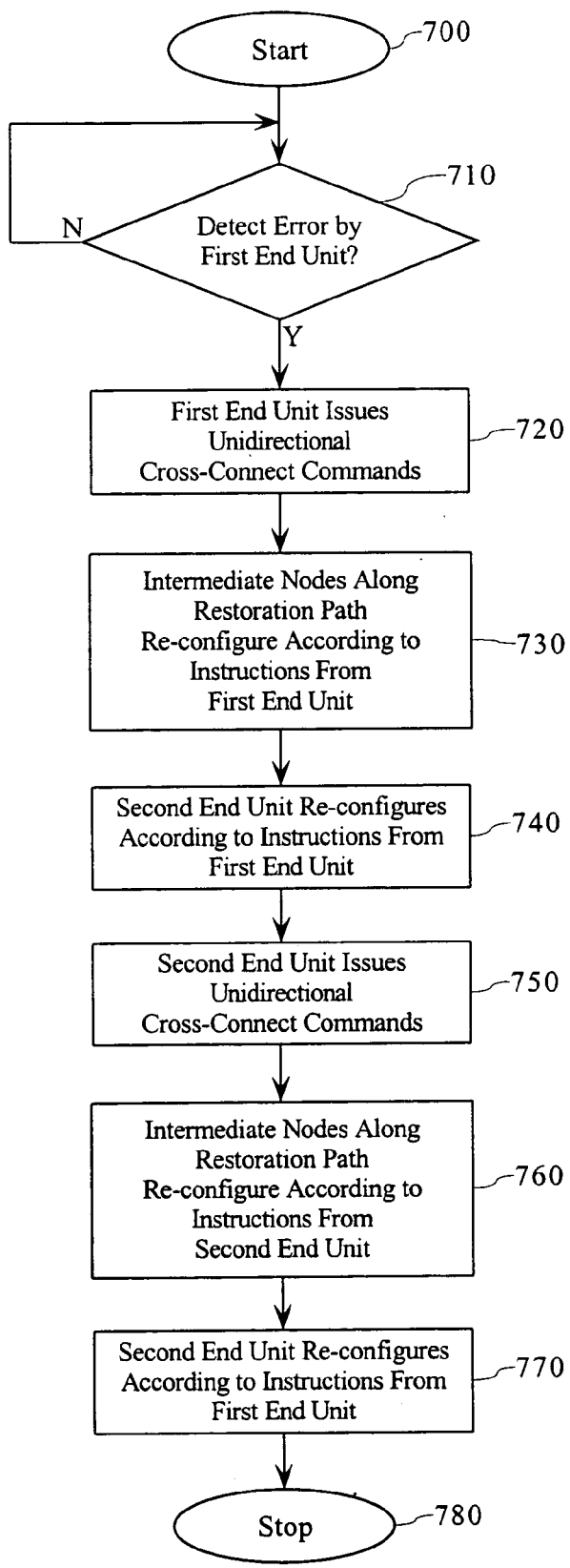
FIG. 7 is a flowchart illustrating a third exemplary method for rerouting a communication signal according to the invention.

FIG. 7 is a flowchart outlining a third exemplary embodiment of the methods for restoring communication traffic in a mesh network. Unlike the methods of FIGS. 5 and 6, the end communication nodes both issue unidirectional cross-connect commands rather than bi-directional cross-connect commands. Unidirectional commands, unlike bi-directional commands, reconfigure communication for one direction only.

The process starts in step 700 and continues to step 710 where a determination is made whether a first end node detects an excessive error condition or failure. If an excessive error condition or failure is detected, the process continues to step 720, otherwise, step 710 is repeated.

In step 720, because an excessive error condition or failure is detected by the first end node, the first end node issues unidirectional cross-connect commands along a predetermined restoration path. In the exemplary method, the first end node fast-forwards the commands by issuing them to each intermediate node along the restoration path one at a time and then issues commands to the second end node, however, the first end node can issue commands to all other nodes along the restoration path serially, simultaneously or in any other fashion such as using a broadcast command to all the intermediate nodes without departing from the spirit and scope of the present invention. The process continues to step 730.

In step 730, the intermediate nodes along the restoration path unidirectionally reroute the data signal according to the commands given by the first communication end node. In the exemplary method, the intermediate nodes along the restoration path can reconfigure one at a time upon receiving instructions, however, the intermediate nodes can reconfigure at substantially the same time without departing from the spirit and scope of the present invention. The process continues to step 740.

In step 740, the second end communication node receives instructions from the first end communication node and the second end node reconfigures to reroute the communication signal according to the commands from the first communication node.

At this point, communication in one direction is restored, however, the second end node can optionally reconfigure unidirectional communication in the other direction towards the first end node. If communication along two separate paths is acceptable, no further actions are necessary, however, if bi-directional communication along the same path is desirable, the second end node can reconfigure itself for bi-directional communication along the restoration path and the process continues to step 750.

In step 750, the second communication end node issues unidirectional cross-connect commands to the other communication nodes along the restoration path. Next, in step 760, the intermediate nodes along the restoration path reconfigure to reroute the communication signal according to the unidirectional cross-connect commands issued by the second communication end node. Finally, in step 770, the first end communication node reconfigures itself according to the instructions from the second end node, thus establishing bi-directional communication along the restoration path. The process then continues to step 780 where the operation stops.

In this third exemplary method, it should be appreciated that, because the two end communication nodes can operate independently, each end node can issue its own set of commands according to the method of FIG. 7. Accordingly, both communication end nodes can simultaneously or nearly simultaneously issue their own commands such that by the time a first unidirectional communication is established along the restoration path, the second unidirectional communication can be simultaneously established thereby effectively establishing bi-directionally communication along the restoration path without either end node completing all the steps of FIG. 7.

Also in this third exemplary method, as with the previous two methods, because each transmission line of a network can have a large number of independent channels, the channels along the restoration path that will carry a particular communication signal can be allocated at the time of restoration.

While the exemplary methods of FIGS. 5–7 can restore communication between the two end nodes, it should be appreciated that situations can arise where the intermediate nodes along the normal communication path can still be configured to pass data between the two end nodes. Because this can create contention problems or because these nodes as configured can waste usable bandwidth that could be used by other communication paths, one or both end nodes can send commands to the intermediate nodes along the normal communication path to reconfigure the intermediate nodes.

While the exemplary mesh network 130 of FIGS. 2 and 4 is an optical mesh network using optical cross connects, it should be appreciated that any network, including an electrical mesh network, can be used without departing from the spirit and scope of the present invention. Accordingly, while the communication nodes 200–218 are optical cross connects, the connection nodes 200–218 can be any combination of optical and electrical technologies, such as ethernet devices, 10baseT devices, 100baseT devices and the like. In general, the communication nodes 200–218 can be any combination of known or later developed connection systems or structures usable to transmit and receive communication signals without departing from the spirit and scope of the present invention.

Furthermore, while the transmission lines 250–272 of the exemplary mesh network 130 of FIGS. 2 and 4 are fiber optic cables, the transmission lines 250–272 can be any combination of lines such as direct serial/parallel electrical cable connections, coaxial cable, twisted wire pairs and the like. In general, the transmission lines 250–272 can be any combination of known or later developed connection systems or structures usable to connect the various communication nodes 200–218.

As shown in FIG. 3, the methods of this invention are preferably implemented using a number of programmed special purpose computers with peripheral integrated circuit elements and dedicated communication hardware. However, the communication nodes can be implemented using any combination of one or more programmed general purpose computers, programmed microprocessors or micro-controllers and peripheral integrated circuit elements, ASIC or other integrated circuits, digital signal processors, hardwired electronic or logic circuits such as discrete element circuits, programmable logic devices such as a PLD, PLA, FPGA or PAL, or the like. In general, any device, capable of implementing a finite state machine that is in turn capable of implementing the flowcharts shown in FIGS. 5–7, can be used to implement the communication nodes.

While this invention has been described in conjunction with the specific embodiments thereof, it is evident that many alternatives, modifications, and variations will be apparent to those skilled in the art. Accordingly, preferred embodiments of the invention as set forth herein are intended to be illustrative, not limiting. Thus, there are changes that may be made without departing from the spirit and scope of the invention.

What is claimed is:

1. A method that restores communication in a mesh network between a first end node and a second end node, comprising:
    transmitting a communication signal over a first communication path comprising the first end node, the second end node and one or more first intermediate nodes;
    detecting an error condition at at least one of the first end node and the second end node, said error condition being not adjacent to said at least one end node; and
    said at least one end node initiating rerouting the communication signal over a second communication path based on the detected error condition in order to restore communication, the second path having been chosen before the error condition was detected, to carry the rerouted communication sisal and the second path including the first end node, the second end node, and one or more second intermediate nodes, wherein the second intermediate nodes are disjoint from the one or more first intermediate nodes;
        the second path further including one or more transmission lines each having a plurality of channels, at least one said channel being assigned, after the error condition is detected, to carry the communication signal.

2. The method of claim 1, further comprising sending one or more back-off commands to release at least one channel that had been assigned, after the error condition had been detected, to carry the communication signal.

3. The method of claim 1, wherein the first and second end nodes coordinate rerouting the communication signal over the second path.

4. The method of claim 1, wherein the mesh network is an optical mesh network.

5. The method of claim 1, wherein the step of rerouting the communication signal includes
    issuing commands, after the error condition is detected, in a direction from the first end node to at least one of the second intermediate nodes to bi-directionally assign channels in at least one of said transmission lines, and
    issuing commands, after the error condition is detected, in a direction from the second end node to at least one of the second intermediate nodes to bi-directionally assign channels in at least one of said transmission lines.

6. The method of claim 1, wherein the step of rerouting the communication signal includes:
    responding to a failure indication sent from the first end node to the second end node by issuing commands from the second end node to the one or more second intermediate nodes to bi-directionally assign channels along the second path.

7. The method of claim 1, wherein the step of rerouting the communication signal includes issuing commands from the first end node to the one or more second intermediate nodes to unidirectionally assign channels along the second path in a first direction.

8. The method of claim 7, wherein the step of rerouting the communication signal further includes issuing commands from the second end node to the one or more second intermediate nodes to unidirectionally assign channels along the second path in a second direction.

9. The method of claim 1, wherein the mesh network is a synchronous optical network (SONET) defined by the ANSI T1.105.

10. The method of claim 1, wherein channels are assigned to carry the communication signal over the second path using a contention technique.

11. A mesh network having a first end node and a second end node, comprising:
    a first communication path that transmits a communication signal, the first communication path including the first end node, the second end node and one or more first intermediate nodes;
    an error detecting device in at least one of the first end node and the second end node for detecting the occurrence of an error in any portion of said first communication path; and
    a predetermined second communication path that is chosen, before the error detecting device detects an error condition, to transmit the communication signal in the event that the error detecting device detects an error condition, the predetermined second path comprising the first end node, the second end node, and one or more second intermediate nodes, wherein the second intermediate nodes are disjoint from the one or more first intermediate nodes;
    the second path further including one or more transmission lines each having a plurality of channels, and at least one said channel being assigned, after the error condition is detected, to carry the communication signal.

12. The mesh network of claim 11, wherein the communication signal is rerouted from the first path to the second path based on an error condition detected by the error detecting device.

13. The mesh network of claim 11, wherein the communication signal is rerouted from the first path to the second path based on a communication of the second end node.

14. The mesh network of claim 11, wherein the first end node responds to an error condition by issuing commands to the one or more second intermediate nodes to unidirectionally assign channels along the second path in a first direction.

15. The mesh network of claim 14, wherein the second end node responds to the error condition by issuing commands to the one or more second intermediate nodes to unidirectionally assign channels along the second path in a second direction.

16. The mesh network of claim 11, wherein the mesh network is a synchronous optical network (SONET) defined by the ANSI T1.105.

17. The mesh network of claim 11, wherein one or more channels of at least one of said transmission lines are assigned to carry the communication signal using a contention technique.

18. A method for rerouting communications between first and second nodes of a mesh network upon a failure in a first path between the first and second nodes, the method comprising rerouting the communications over a second path that was chosen prior to a failure, to carry the communications in the event of a failure, the second path being node and span disjoint from the first path and the communications in the second path being carried over at least one assigned channel in at least one transmission line between at least one pair of nodes of the second path, said rerouting including assigning said at least one channel after said failure occurred.

19. The method of claim 18 wherein said assigning further includes
    assigning bi-directional channels in transmission lines of the second path in a direction from the first node toward the second node and concurrently assigning bi-directional channels in transmission lines of the second path in a direction from the second node toward the first node.

20. The method of claim 18 wherein the mesh network is an optical network.

21. The method of claim 18 wherein the mesh network is a synchronous optical network (SONET) defined by ANSI T1.105.

22. A method for use in a mesh network comprising nodes interconnected by links, the method comprising:

establishing a first communication path from a first node to a second node, the first communication path including at least two of said links and at least one intermediate node;

directing communications traffic from the first end node to the second end node over the first path; and responsive to a failure in the first path, rerouting the traffic to a second communication path that had been identified prior to said failure as being the path over which the traffic would be rerouted in the event of a failure in the first path, the second path including at least two of said links and at least one intermediate node, the second path being node and span disjoint from the first path, and the traffic over the second path being directed over at least one assigned channel within a multichannel link of the second path that was assigned subsequent to said failure.

23. The method of claim 22 wherein said rerouting includes assigning bi-directional channels in links of the second path in a direction from the first node toward the second node and concurrently assigning bi-directional channels in transmission lines of the second path in a direction from the second node toward the first node.

24. The method of claim 22 wherein the mesh network is a synchronous optical network (SONET) defined by ANSI T1.105.

25. A method for use in a mesh network comprising nodes interconnected by transmission lines, at least two of the transmission lines being capable of carrying communication traffic in a plurality of channels, the method comprising:

establishing a first communication path between a first node and a second node, the first communication path including at least two of the transmission lines and at least one intermediate node;

directing communications traffic from the first end node to the second end node over assigned channels of the transmission lines in the first path; and responsive to a failure in the first path, rerouting the traffic over assigned channels in the transmission lines of a second communication path between the first node and the second node, the second communication path having been chosen prior to said failure as being the path over which said communications traffic would be directed in the event of a failure in the first path, the second path having at least one intermediate node, the second path having no intermediate nodes or transmission lines in common with the first path, and at least one of the channels in the transmission lines of the second path being assigned subsequent to said failure.

26. The method of claim 25 wherein said rerouting includes assigning bi-directional channels in transmission lines of the second path in a direction from the first node toward the second node and concurrently assigning bi-directional channels in transmission lines of the second path in a direction from the second node toward the first node.

27. The method of claim 25 wherein the mesh network is a synchronous optical network (SONET) defined by ANSI T1.105.

28. A node for use as a first node in a mesh network of a type in which communications signals between said first node and a second node of said network over a first path through said network are rerouted over a second path through said network upon a failure in said first path, said second path having been identified prior to said failure as being the path over which said communications signals would be rerouted in the event of a failure in said first path, the second path being node and span disjoint from the first path, said first node being arranged to initiate, after said failure in said first path, an assignment of channels, within links connecting pairs of nodes in the second path, to carry said communications signals.

29. The invention of claim 28 wherein an identification of said second path is stored in said first node.

30. The node of claim 29 wherein said assignment includes assigning bi-directional channels in links of the second path in a direction from said first node toward the second node irrespective of whether said second node has initiated concurrent assignment of bi-directional channels in links of the second path in a direction from the second node toward said first node.

31. A method for use by a first node in a mesh network of a type in which communications signals between said first node and a second node of said network over a first path through said network are rerouted over a second path through said network upon a failure in said first path, said second path having been identified prior to said failure as being the path over which said communications signals would be rerouted in the event of a failure in said first path the second path being node and span disjoint from the first path, said method comprising initiating, after said failure in said first path, the assignment of channels, within links connecting pairs of nodes in the second path, to carry said communications signals.

32. The invention of claim 31 wherein an identification of said second path is stored in said first node.

33. The node of claim 32 wherein said assignment includes assigning bi-directional channels in links of the second path in a direction from said first node toward the second node irrespective of whether said second node has initiated concurrent assignment of bi-directional channels in links of the second path in a direction from the second node toward said first node.

34. A computer-readable medium on which are stored instructions that, when executed by one or more nodes in a mesh network, carry out a method for rerouting communications between first and second nodes of the network upon a failure in a first path between the first and second nodes, the method comprising rerouting the communications over a second path identified prior to said failure as being the path over which said communications would be rerouted in the event of a failure in the first path, the second path being node and span disjoint from the first path and the communications in the second path being carried over at least one assigned channel in at least one transmission line between at least one pair of nodes of the second path, said rerouting including assigning said at least one channel after said failure occurred.

35. The computer-readable medium of claim 34 wherein said method carries out said rerouting by assigning bi-directional channels in transmission lines of the second path in a direction from the first node toward the second node and concurrently assigning bi-directional channels in transmission lines of the second path in a direction from the second node toward the first node.

36. The method of claim 18 wherein said first and second nodes are the end nodes of said first and second paths, wherein at least one of said first and second end nodes is adapted to determine when failures occur in portions of said first path that are adjacent to said at least one end node and in portions of said first path that are not adjacent to said at least one end node, and wherein said rerouting is initiated by said at least one end node.

37. The method of claim 22 wherein said first and second nodes are the end nodes of said first and second paths, wherein at least one of said first and second end nodes is adapted to determine when failures occur in portions of said first communication path that are adjacent to said at least one end node and in portions of said first communication path that are not adjacent to said at least one end node, and wherein said rerouting is initiated by said at least one end node.

38. The method of claim 25 wherein said first and second nodes are the end nodes of said first and second communication paths, wherein at least one of said first and second end nodes is adapted to determine when failures occur in portions of said first communication path that are adjacent to said at least one end node and in portions of said first communication path that are not adjacent to said at least one end node, and wherein said rerouting is initiated by said at least one end node.

39. The method of claim 28 wherein said first and second nodes are the end nodes of said first and second paths, and wherein said first node is adapted to determine when failures occur in portions of said first path that are adjacent to said at least one end node and in portions of said first path that are not adjacent to said first node.

40. The method of claim 31 wherein said first and second nodes are the end nodes of said first and second paths, and wherein said first node is adapted to determine when failures occur in portions of said first path that are adjacent to said at least one end node and in portions of said first path that are not adjacent to said first node.

41. The method of claim 34 wherein said first and second nodes are the end nodes of said first and second paths, wherein at least one of said first and second end nodes is adapted to determine when failures occur in portions of said first path that are adjacent to said at least one end node and in portions of said first communication path that are not adjacent to said at least one end node, and wherein said rerouting is initiated by said at least one end node.

* * * * *